United States Patent
Campagna et al.

(10) Patent No.: US 8,875,168 B2
(45) Date of Patent: Oct. 28, 2014

(54) AUDIO/VIDEO MONITORING SERVICE USING SET-TOP BOXES AND APPLICATION SERVERS

(75) Inventors: Theresa Campagna, Philadelphia, PA (US); David Lee Chavez, Jr., Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 685 days.

(21) Appl. No.: 12/512,517

(22) Filed: Jul. 30, 2009

(65) Prior Publication Data

US 2011/0030021 A1  Feb. 3, 2011

(51) Int. Cl.
| | |
|---|---|
| H04H 60/56 | (2008.01) |
| H04N 21/222 | (2011.01) |
| H04N 21/442 | (2011.01) |
| H04N 21/422 | (2011.01) |
| H04N 21/6543 | (2011.01) |
| H04N 21/6332 | (2011.01) |
| H04N 7/18 | (2006.01) |
| H04N 21/658 | (2011.01) |
| H04N 21/4223 | (2011.01) |

(52) U.S. Cl.
CPC .............. *H04N 7/181* (2013.01); *H04N 21/222* (2013.01); *H04N 21/442* (2013.01); *H04N 21/42203* (2013.01); *H04N 21/6543* (2013.01); *H04N 21/6332* (2013.01); *H04N 21/6582* (2013.01); *H04N 21/4223* (2013.01); *H04N 21/44218* (2013.01)
USPC ................. 725/12; 725/14; 725/19; 725/133; 725/141; 725/153; 348/143

(58) Field of Classification Search
USPC .................. 725/9, 12, 14, 19, 133, 141, 153; 348/143
See application file for complete search history.

(56) References Cited

U.S. PATENT DOCUMENTS

| | | | | |
|---|---|---|---|---|
| 5,642,156 A | * | 6/1997 | Saiki | 348/14.09 |
| 6,061,056 A | * | 5/2000 | Menard et al. | 715/704 |
| 6,810,526 B1 | * | 10/2004 | Menard et al. | 725/46 |
| 6,947,411 B2 | * | 9/2005 | Parker et al. | 370/352 |
| 2002/0091791 A1 | * | 7/2002 | Kang | 709/217 |
| 2002/0095490 A1 | * | 7/2002 | Barker et al. | 709/224 |
| 2003/0018975 A1 | * | 1/2003 | Stone | 725/105 |
| 2004/0004542 A1 | * | 1/2004 | Faulkner et al. | 340/506 |
| 2004/0114036 A1 | * | 6/2004 | Karaoguz et al. | 348/142 |

(Continued)

OTHER PUBLICATIONS

Extended Search Report for European Patent Application No. 10170646.3, mailed Apr. 23, 2014, 7 pages.

*Primary Examiner* — Jason Salce
(74) *Attorney, Agent, or Firm* — Sheridan Ross P.C.

(57) ABSTRACT

An audio/video monitoring system is disclosed, comprising a combination of one or more set-top boxes and application servers in a service provider's network. The set-top boxes and applications services are part of a multiple services operator's (MSO) network, such as that of a cable company. Cameras and/or microphones which are directly connected to a set-top box are the sources of media signals, which the set-top box transmits to an application server. The application server continually receives the media signals from one or more set-top boxes, and determines which subset of the received media signals to forward to a selected output device, such as a television connected to another set-top box or a cellular telephone. The application server then forwards media signals of interest to the output device, such as when motion or a loud noise is detected in a media signal received from the set-top box or boxes.

17 Claims, 7 Drawing Sheets

(56) References Cited

U.S. PATENT DOCUMENTS

| | | | |
|---|---|---|---|
| 2005/0078180 A1* | 4/2005 | Nakamura | 348/143 |
| 2005/0086688 A1* | 4/2005 | Omoigui | 725/35 |
| 2005/0125836 A1* | 6/2005 | Estevez et al. | 725/105 |
| 2008/0046946 A1* | 2/2008 | Diroo et al. | 725/112 |
| 2008/0129821 A1* | 6/2008 | Howarter et al. | 348/143 |
| 2008/0186979 A1 | 8/2008 | Kolar | |
| 2008/0201757 A1* | 8/2008 | Lee et al. | 725/131 |
| 2008/0273591 A1* | 11/2008 | Brooks et al. | 375/240.01 |
| 2008/0309759 A1* | 12/2008 | Wilson et al. | 348/143 |
| 2009/0066795 A1 | 3/2009 | Wollmershauser et al. | |
| 2010/0269146 A1* | 10/2010 | Britt | 725/110 |

* cited by examiner

AUDIO/VIDEO MONITORING SERVICE USING SET-TOP BOXES AND APPLICATION SERVERS

FIELD OF THE INVENTION

The present invention relates to telecommunications in general, and, more particularly, to audio and/or video monitoring based upon one or more set-top boxes and application servers.

BACKGROUND OF THE INVENTION

Open Cable Application Platform (OCAP) is a standardized software environment, which has been developed to encourage compatibility and reduce hardware and/or software costs. OCAP comprises a set of application programming interfaces (API), which is middleware that provides an operating system for the application programs themselves. The API's comprise Java software packages that provide program access to basic system resources. An OCAP-compliant application program can thus run on any OCAP compatible devices to access network services and multimedia content, among other functions. The OCAP middleware enables the development of software to provide new features and services, and also enables third-party developers to develop those new features and services.

Because OCAP facilitates "write once, use anywhere" application software, OCAP enables Multiple Services Operators (MSO) to design and deploy a variety of new interactive communications services. The MSOs include cable companies, as well as other service operators who might or might not be offering cable service to their subscribers. Generally-speaking, the MSOs are working to transform their business models from those which are dominated by basic subscriptions and equipment lease to those which are dominated by a customer service-driven model. One of the reasons for this is a Federal Communications Commission (FCC) ruling and upheld court challenge that the MSOs adopt OCAP and that set-top boxes be open to new uses.

In addition to OCAP, set-top boxes (STB) are other enablers of new features and services. STBs have evolved over time, from a relatively simple switching device to what is essentially a special-purpose computer, comprising impressive storage capability, multimedia encoding and decoding capability, and processing power. For example, more advanced STBs have digital video recorder capability, based on hard-disk drives or flash memory, which provide gigabytes of available storage. The advanced audio and video codecs present in some STBs are designed to handle the requirements of High-Definition Television (HDTV). And processors such as the Broadcom BCM7118 provide over 1000 DMIPS of processing power, which can be used to support OCAP and new customer applications, as well as other enablers of new STB-based features and services.

All of these technologies set the stage for a greatly-enhanced, multimedia, customer communication experience. Indeed, telephony-based services have already been proposed, which use network-based application servers, at which telephone and set-top box association can be performed and administered. Similarly, personalized information for the display of financial data, home security information, and so forth is also known.

SUMMARY OF THE INVENTION

The present invention enables an audio/video monitoring system, without some of the disadvantages that are known in the prior art. Although monitoring systems exist in the prior art, these prior-art systems often lack the level of integration and security provided in accordance with the illustrative embodiment of the present invention.

In accordance with the illustrative embodiment, a combination of one or more set-top boxes and application servers in a service provider's network are configured to provide an audio and video monitoring service for a customer of that service provider. The set-top boxes and applications services are part of a multiple services operator's (MSO) network, such as that of a cable company. Cameras and/or microphones which are connected to a set-top box are the sources of media signals, which the set-top box transmits to an application server. Meanwhile, the application server continually receives the media signals from one or more set-top boxes, and determines which subset of the received media signals to forward to a selected output device, such as a television connected to another set-top box, a cellular telephone, and so forth. The application server then forwards selected media signals of interest to the output device, such as when a change is detected in a media signal received from the set-top box or boxes. Such a detected change might be the presence of motion in a signal conveying video or a loud noise in a signal conveying audio.

In a first illustrative application, the monitoring service can be used to monitor a sleeping infant in one room equipped with a microphone connected to a first set-top box. The audio, or video for that matter, is provided to the infant's parent or caregiver through an output device in the parent's vicinity. The parent can be in the same house listening to the cable provider's music programming, in another room equipped with a second set-top box. Alternatively, the parent can be at the next-door neighbor's house watching television on a third set-top box. Another possibility is that the parent is in the yard, carrying a cell phone or other type of output device. When motion or a loud noise is detected in the media signal received from the set-top box connected to the baby monitor, the service can forward the signal of interest to the parent's output device.

In a second illustrative application, a safety security service can use the monitoring service of the illustrative embodiment to monitor houses within a neighborhood or buildings belonging to a business by using cameras connected to set-top boxes in the structures being monitored. When motion or a loud noise is detected in the media signal received from one or more of the set-top boxes, the service can notify the owner of the particular home or dwelling, or a security guard who can then investigate further.

Advantageously, the monitoring service of the illustrative embodiment is enabled by the Open Cable Application Platform (OCAP) standardized software environment that is conducive to the design and implementation of the service described herein. Additionally, relatively recent advances in set-top box design not only enable the features of the illustrative embodiment, but also ensure computing security in the sense that eavesdroppers would find it difficult to hijack the media signals of the monitoring service, because of systems such as Polycipher Downloadable Conditional Access Security, or "DCAS."

The illustrative embodiment of the present invention comprises: receiving, at a server: i) a first identifier of an input device, the input device being situated at a first customer premises equipment location and being capable of generating a first media signal, ii) a second identifier of an output device, the output device being capable of presenting the first media signal to a user, and iii) a trigger condition for evaluating the first media signal, the server being situated at a location that is different from the first customer premises equipment location; receiving, at the server, the first media signal originating at the input device represented by the first identifier; and when the trigger condition is met, transmitting the first media signal to the output device represented by the second identifier.

DETAILED DESCRIPTION

For the purpose of this Specification and the appended Claims, the term "customer premises equipment" (CPE), as well as its inflected forms, refers to terminal equipment such as a set-top box, associated equipment, and inside wiring that are located on a subscriber's premises (i.e., physical location such as a house or office building), rather than on the service provider's premises or in between, and connected to a carrier's bearer channel. The physical location at which a CPE is situated is referred to as the "CPE location" of that CPE. One or more set-top boxes can be situated at a CPE location.

Figure 1:
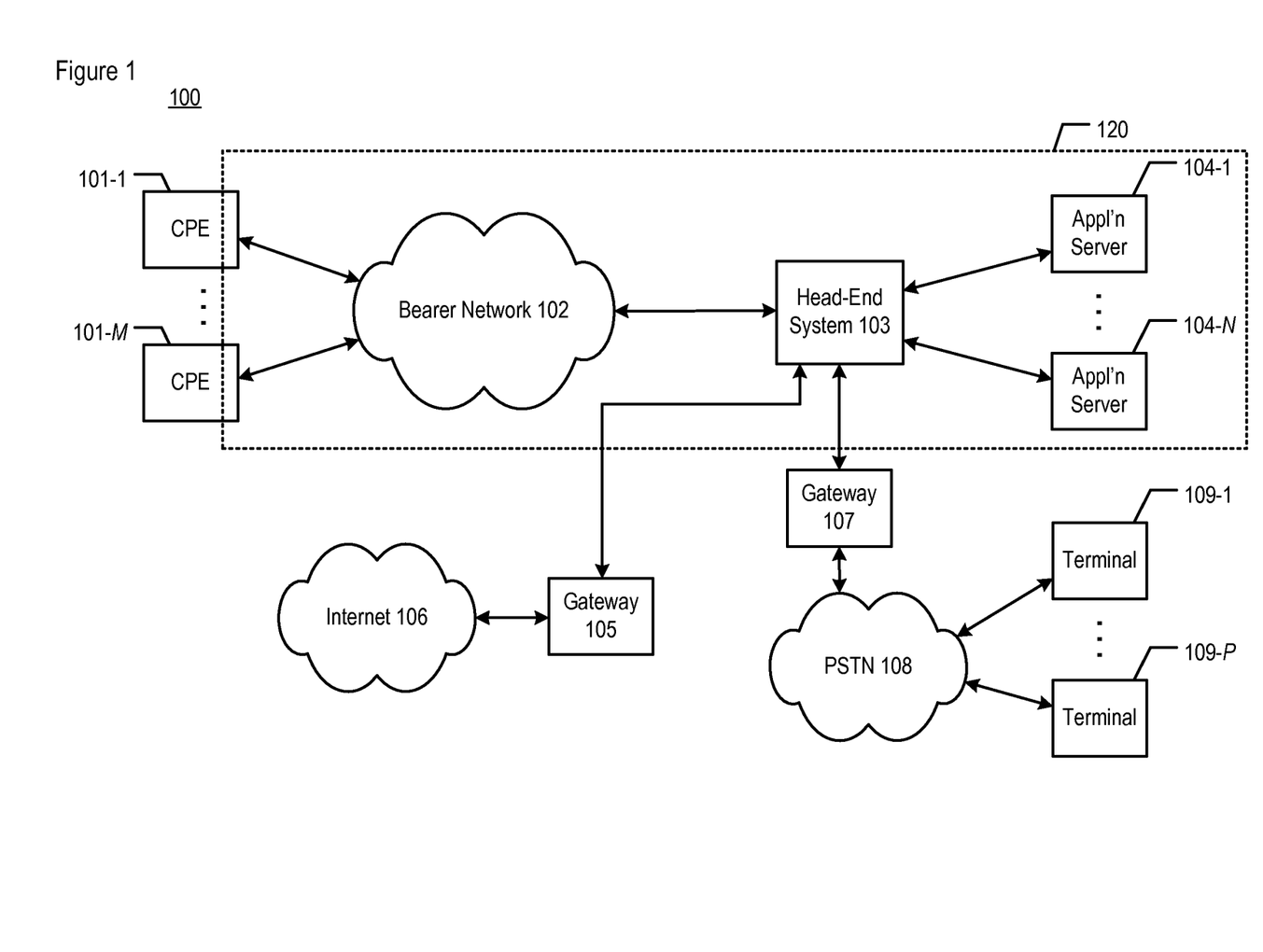
FIG. 1 depicts a schematic diagram of a portion of telecommunications network 100, in accordance with the illustrative embodiment of the present invention.

FIG. 1 depicts a schematic diagram of a portion of telecommunications network 100, in accordance with the illustrative embodiment of the present invention. Telecommunications network 100 comprises customer premises equipment (CPE) 101-1 through 101-M, bearer network 102, head-end system 103, application servers 104-1 through 104-N, Internet gateway 105, Internet network 106, PSTN gateway 107, Public-switched telephone network (PSTN) 108, and telephones 109-1 through 109-P, interconnected as shown, wherein M, N, and P are positive integers. Network 100 supports the monitoring service of the illustrative embodiment.

CPE 101-*m*, wherein m has a value between 1 and M inclusive, comprises one or more set-top boxes, as well as associated equipment and inside wiring. Each CPE 101-*m* corresponds to a particular physical location such as a house, a building, or some other defined site. CPE 101-*m* is described below and with respect to FIG. 2. The set-top box or boxes that are part of CPE 101-*m* are described below and with respect to FIG. 3.

At least some of CPE 101-1 through 101-M comprise at least one input device that can be used for monitoring an environment, such as a camera or microphone. An input device is capable of generating a media signal which conveys content (e.g., audio, video, etc.), where the generated media signal is provided to one or more of application servers 104-1 through 104-N via network 100.

CPE 101-1 through 101-M are connected to bearer network 102, which distributes signals received from head-end system 103 to the set-top boxes that are part of each CPE, and provides signals received from those set-top boxes such as media signals which convey audio and/or video content, to head-end system 103. Network 102 comprises a combination of optical fiber and coaxial cable.

Head-end system 103 drives bearer network 102 in distributing media signals that are to be presented to a subscriber by CPE 101-*m*. System 103 receives media signals from application servers 104-1 through 104-N. System 103 also receives media signals from set-top box 101-*m* and provides those signals to one or more of application servers 104-1 through 104-N. Specifically, set-top boxes 101-1 through 101-M, bearer network 102, head-end system 103, and application servers 104-1 through 104-N constitute multiple services operator (MSO) network 120. The term "multiple services operator" refers to a service provider that provides multiple services such as voice (mobile and landline), data, and video. MSO network 120 belongs to a cable company that provides additional services than cable television, such as the monitoring service described herein; however, in some alternative embodiments MSO 120 can belong to another type of MSO, as those who are skilled in the art will appreciate.

In accordance with the illustrative embodiment, head-end system 103 also transmits media signals to other endpoints, such as those which are situated within Internet network 106 and in Public Switched Telephone Network (PSTN) 108, which are well-known in the art. Media signals transmitted to an endpoint in network 106 are handled via gateway 105, and media signals transmitted to an endpoint in PSTN 108 are handled via gateway 107, in well-known fashion. As those who are skilled in the art will appreciate, in some alternative embodiments application servers 104-1 through 104-N transmit signals to gateways 105 and 107 directly.

Application server 104-*n*, wherein n has a value between 1 and N inclusive, is a data-processing system that receives control messages and media signals from CPE 101-*m* and distributes those media signals, in accordance with the illustrative embodiment of the present invention. For example, a camera that is part of CPE 101-1 can originate video signals which are continually forwarded to application server 104-2; the server then determines which subset of those video signals are to be forwarded to a display-capable device, such as terminal 109-3, in accordance with the illustrative embodiment. Server 104-*n* is described below and with respect to FIG. 4.

Telecommunications terminals 109-1 through 109-P, wherein p has a value between 1 and P inclusive, are at least some of the possible output devices of the illustrative embodiment. An output device is capable of both receiving a media signal which conveys monitored content and presenting that content (e.g., audio, video, etc.) to a user. As depicted in FIG. 1, terminal 109-*p* is a telephone associated with the Public-Switched Telephone Network, such as a cellular phone, and is categorized as an output device because it has at least one of a display and a loudspeaker. However, it will be clear to those skilled in the art, after reading this specification, how to make and use output devices that are situated elsewhere within telecommunications network 100, such as office desksets or web browsers associated with Internet network 106, or video monitors within one or more of CPE 101-1 through 101-M.

Figure 2:
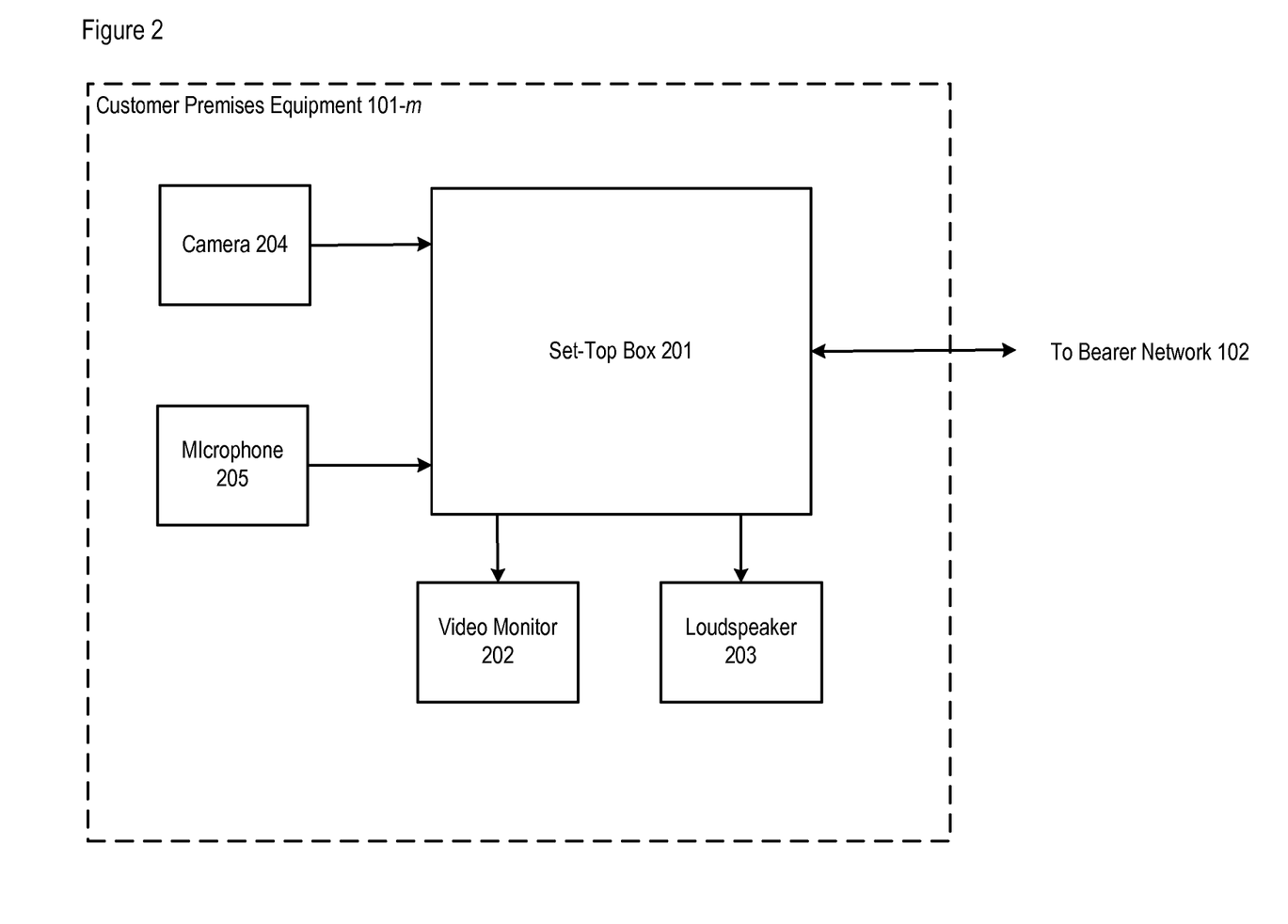
FIG. 2 depicts customer premises equipment 101-*m* of network 100.

FIG. 2 depicts CPE 101-*m* in accordance with the illustrative embodiment of the present invention. CPE 101-*m* comprises set-top box 201, as well as one or more of video monitor 202, loudspeaker 203, camera 204, and microphone 205, interconnected as shown. In some embodiments the connection is physical such as a Universal Serial Bus (USB) connection, while in some other embodiments the connection is wireless such as an IEEE 802.11g link.

Set-top box 201 is essentially a special-purpose computer for the handling of media information at an endpoint in network 100. The components of box 201 are further described below and with respect to FIG. 3. Box 201 is connected to video monitor 202 and loudspeaker 203 for the purpose of presenting video and/or audio content received by the set-top box from a content source such as application server 104-n. In some embodiments, video monitor 202 and loudspeaker 203 are integrated into a single device, such as a television set. In accordance with the illustrative embodiment, box 201 is also connected to one or more monitoring devices, such as video camera 204 and microphone 205, for the purpose of receiving media signals from these monitoring devices. In some embodiments, video camera 204 and microphone 205 are integrated into a single device. Besides the monitoring functions described with this specification, set-top box 201 can also be used for other functions associated with presenting content via a television, such as a cable tuner function and a digital video recorder (DVR) function.

Although set-top box 201 is depicted as being connected to all of video monitor 202, loudspeaker 203, camera 204, and microphone 205, in some alternative embodiments box 201 might be connected to a different configuration of input and output devices, as those who are skilled in the art will appreciate. For example, box 201 might be connected to a different number of cameras or a different number of microphones, or both.

Furthermore, it will be clear to those skilled in the art how to make and use alternative embodiments of CPE 101-m, in which more than one set-top box is present. For example, set-top box 201-1 might be situated in a first room of a structure, set-top box 201-2 in a second room of the structure, and so forth.

Figure 4:
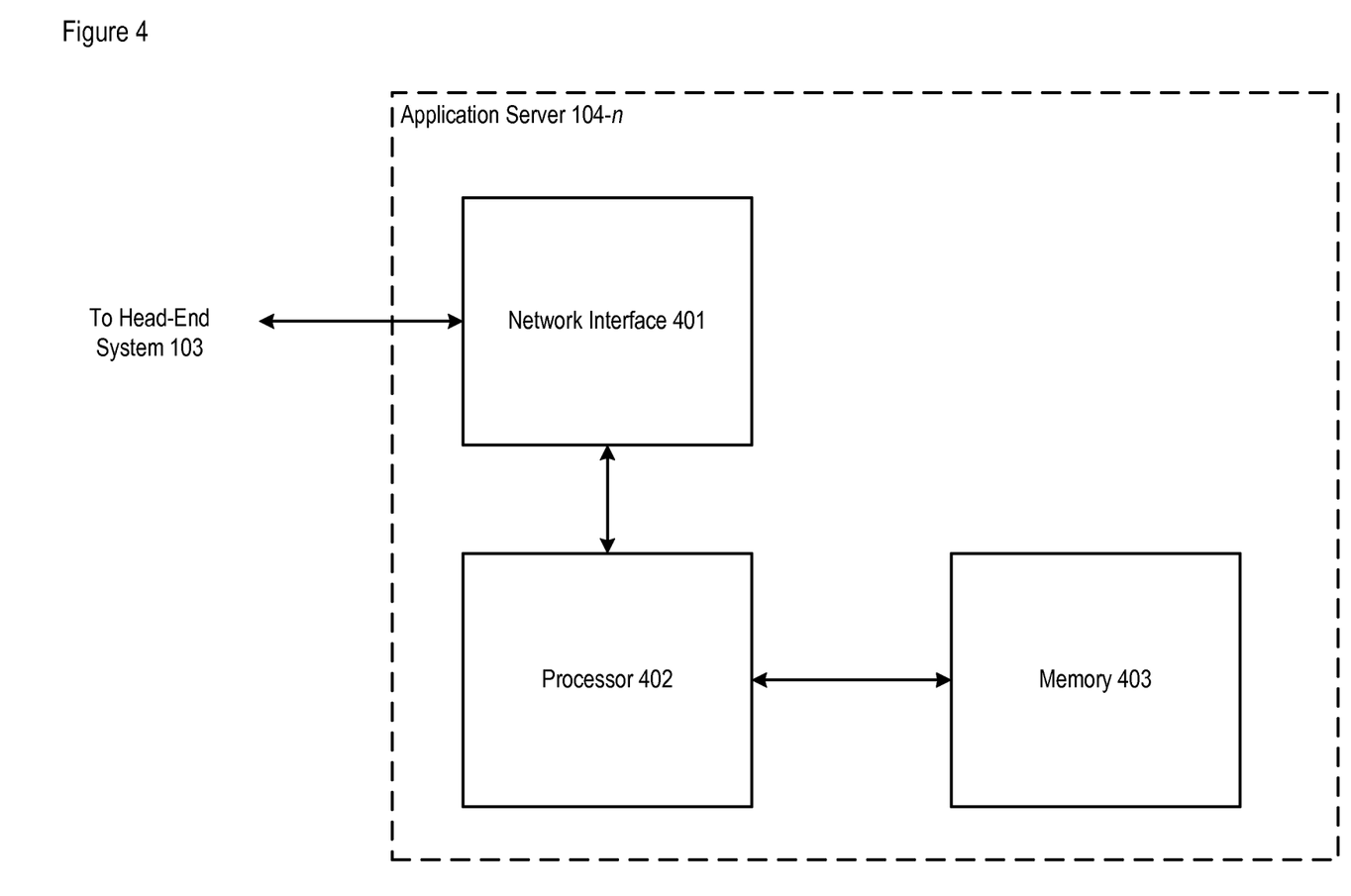
FIG. 4 depicts the salient components of application server 104-*n* of network 100.

In accordance with the illustrative embodiment, set-top box 201, as well as application server 104-n, complies with the Open Cable Application Platform (OCAP), as is known in the art. OCAP is a standardized software environment and comprises a set of application programming interfaces (API), which is middleware that provides an operating system for the application programs themselves. The API's comprise Java software packages that provide program access to basic system resources. An OCAP-compliant application program can thus run on any OCAP compatible devices to access network services and multimedia content, among other functions. OCAP enables the monitoring service of the illustrative embodiment, although it will be clear to those skilled in the art, after reading this specification, how to make and use alternative embodiments in which a different software environment enables the monitoring service described herein.

Figure 3:
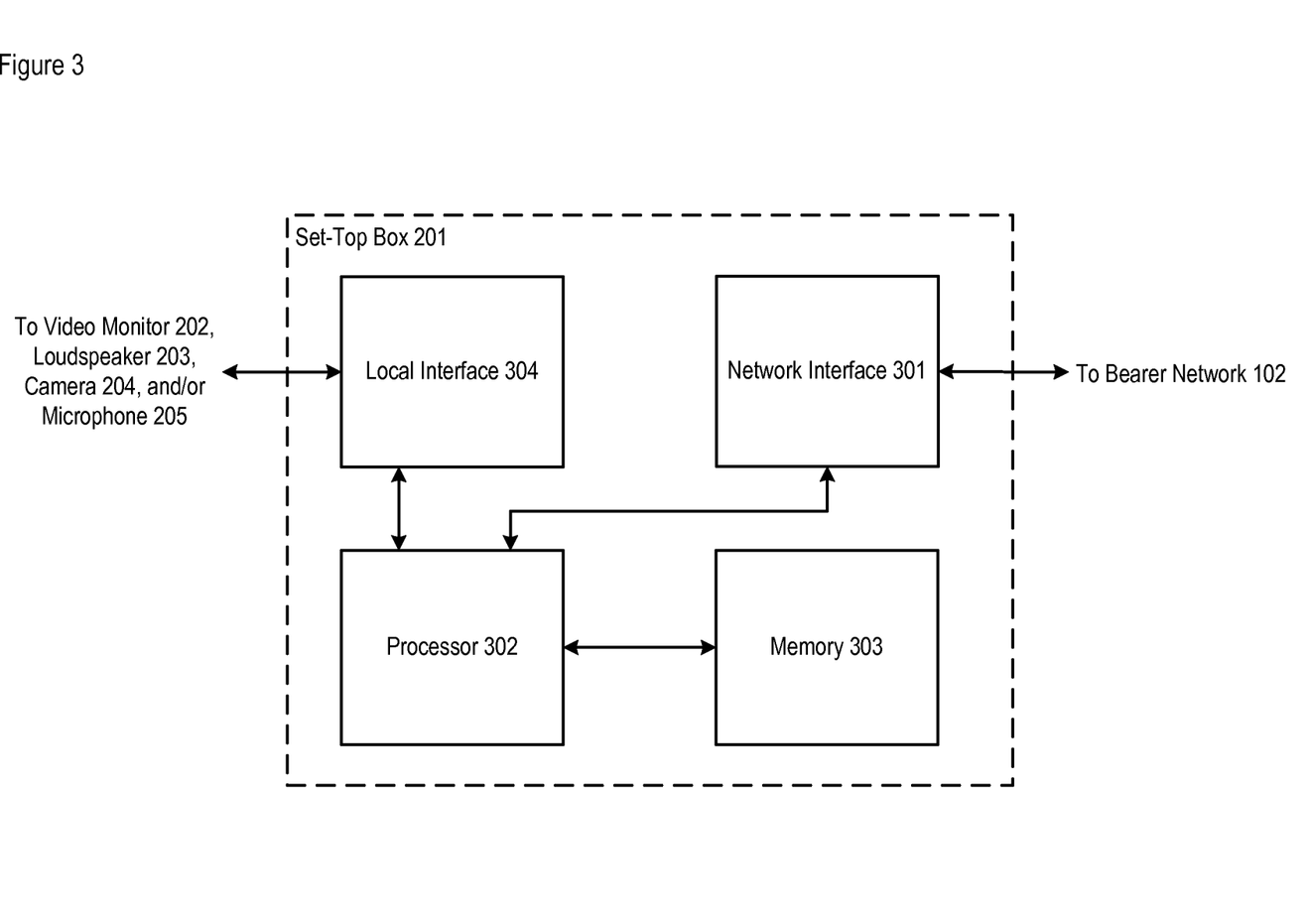
FIG. 3 depicts the salient components of set-top box 201 of customer premises equipment 101-*m*.

FIG. 3 depicts the salient components of set-top box 201, in accordance with the illustrative embodiment of the present invention. Box 201 comprises network interface 301, processor 302, memory 303, and local interface 304, interconnected as shown. It will be clear to those skilled in the art, after reading this disclosure, how to make and use alternative embodiments of the present invention in which box 201 comprises any sub-combination of the components listed above.

Network interface 301 comprises the circuitry that enables box 201 to receive media signals arriving from bearer network 102, such as media signals which convey cable television programming or the monitoring content of the illustrative embodiment, or both. Additionally, interface 301 comprises the circuitry that enables box 201 to transmit media signals generated by input devices (e.g., camera 204, microphone 205, etc.) into bearer network 102, in accordance with the illustrative embodiment.

Processor 302 is a general-purpose processor that is capable of receiving information from and transmitting information to network interface 301 and local interface 304, of executing instructions stored in memory 303 including those that correspond to the tasks of the illustrative embodiment, and of reading data from and writing data into memory 303. Processor 302 is further capable of handling multimedia content encoding and decoding functions. In some alternative embodiments of the present invention, processor 302 might be a special-purpose processor, multiple processors, or both.

Memory 303 stores the instructions and data used by processor 302, in well-known fashion. Memory 303 can be any combination of dynamic random-access memory (RAM), flash memory, disk drive memory, and so forth.

Local interface 304 comprises the circuitry that enables box 201 to transmit, to video monitor 202 and loudspeaker 203, media signals already received from bearer network 102 and decoded by processor 302. Additionally, interface 304 comprises the circuitry that enables box 201 to receive media signals generated by input devices (e.g., camera 204, microphone 205, etc.), in accordance with the illustrative embodiment.

FIG. 4 depicts the salient components of application server 104-n, in accordance with the illustrative embodiment of the present invention. Server 104-n comprises network interface 401, processor 402, and memory 403, interconnected as shown. It will be clear to those skilled in the art, after reading this disclosure, how to make and use alternative embodiments of the present invention in which server 104-n comprises any sub-combination of the components listed above.

Network interface 401 comprises the circuitry that enables server 104-n to receive media signals arriving from head-end system 103, such as media signals which convey the monitoring content of the illustrative embodiment. Additionally, interface 401 comprises the circuitry that enables server 104-n to transmit, to one or more output devices, at least a subset of those received media signals, in accordance with the illustrative embodiment. In some embodiments, interface 401 is further capable of transmitting other types of multimedia content stored at server 104-n, such as conventional cable television and music programming.

Processor 402 is a general-purpose processor that is capable of receiving information from and transmitting information to network interface 401, of executing instructions stored in memory 403 including those that correspond to the tasks of the illustrative embodiment, and of reading data from and writing data into memory 403. Processor 402 is further capable of handling multimedia content encoding and decoding functions. In some alternative embodiments of the present invention, processor 402 might be a special-purpose processor, multiple processors, or both.

Memory 403 stores the instructions and data used by processor 402, in well-known fashion. Memory 403 can be any combination of dynamic random-access memory (RAM), flash memory, disk drive memory, and so forth.

Figure 5:
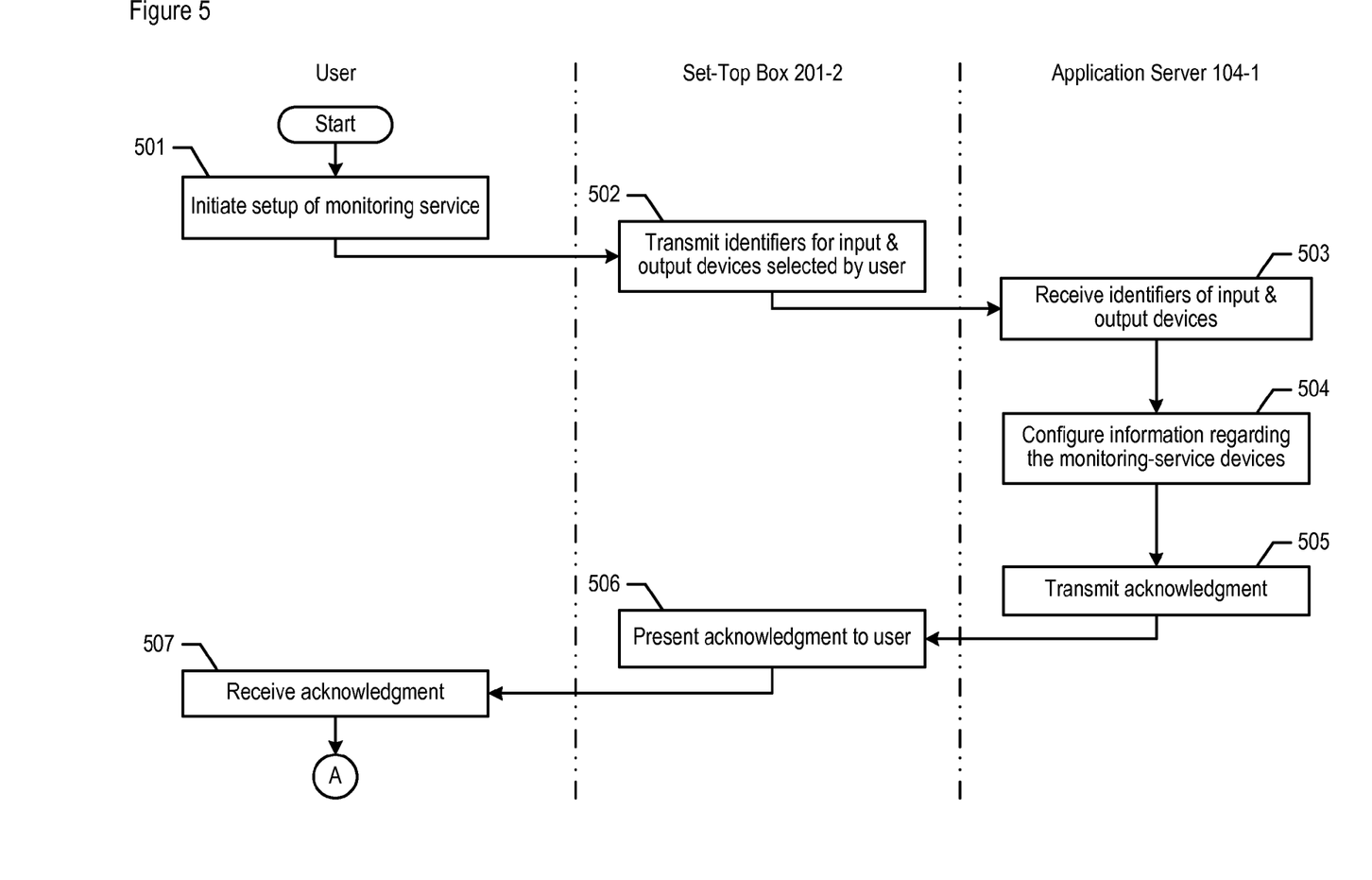
FIG. 5 depicts a flowchart of an initial setup of the monitoring service, in accordance with the illustrative embodiment.
Figure 6:
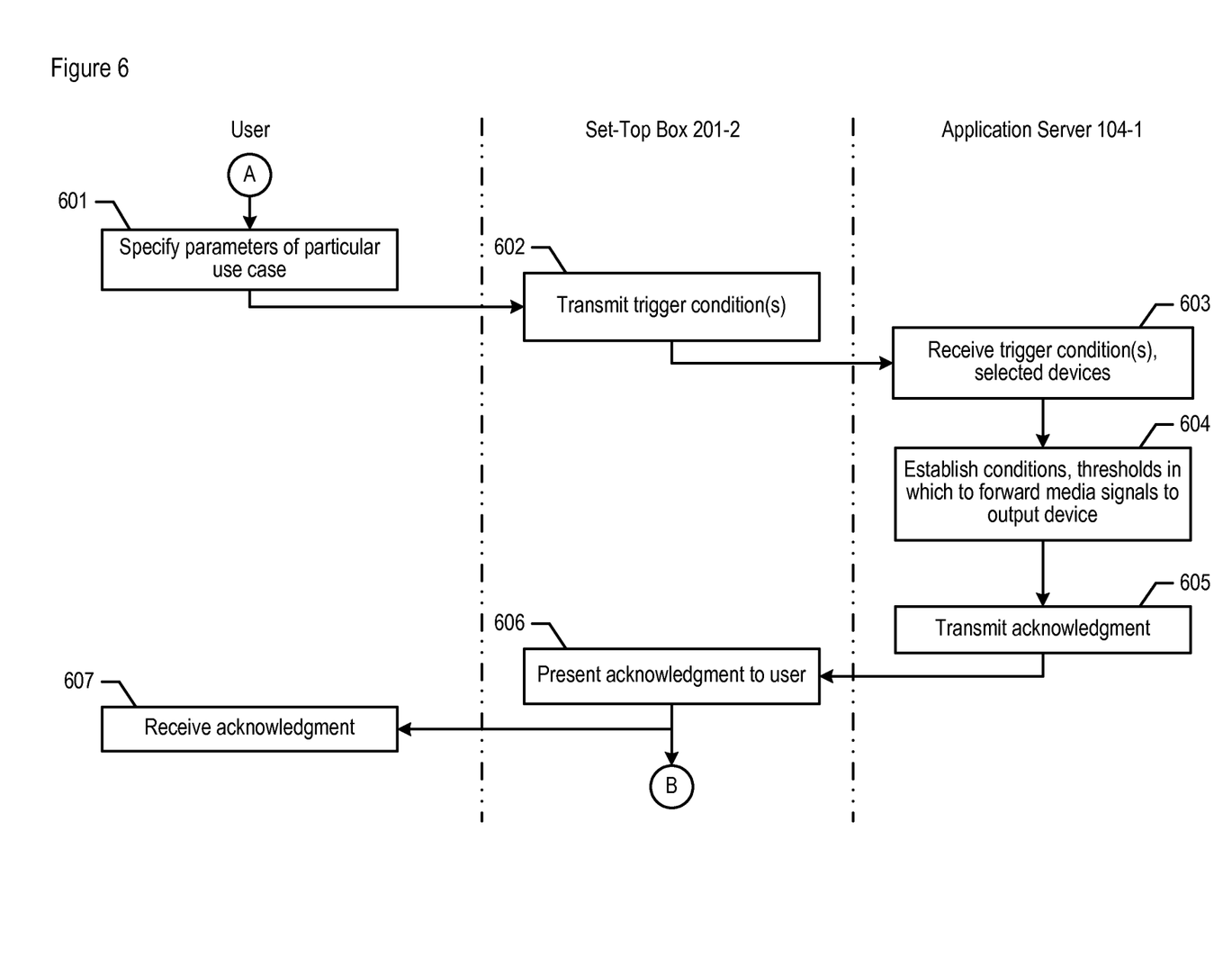
FIG. 6 depicts a flowchart of a use-case setup, in accordance with the illustrative embodiment.
Figure 7:
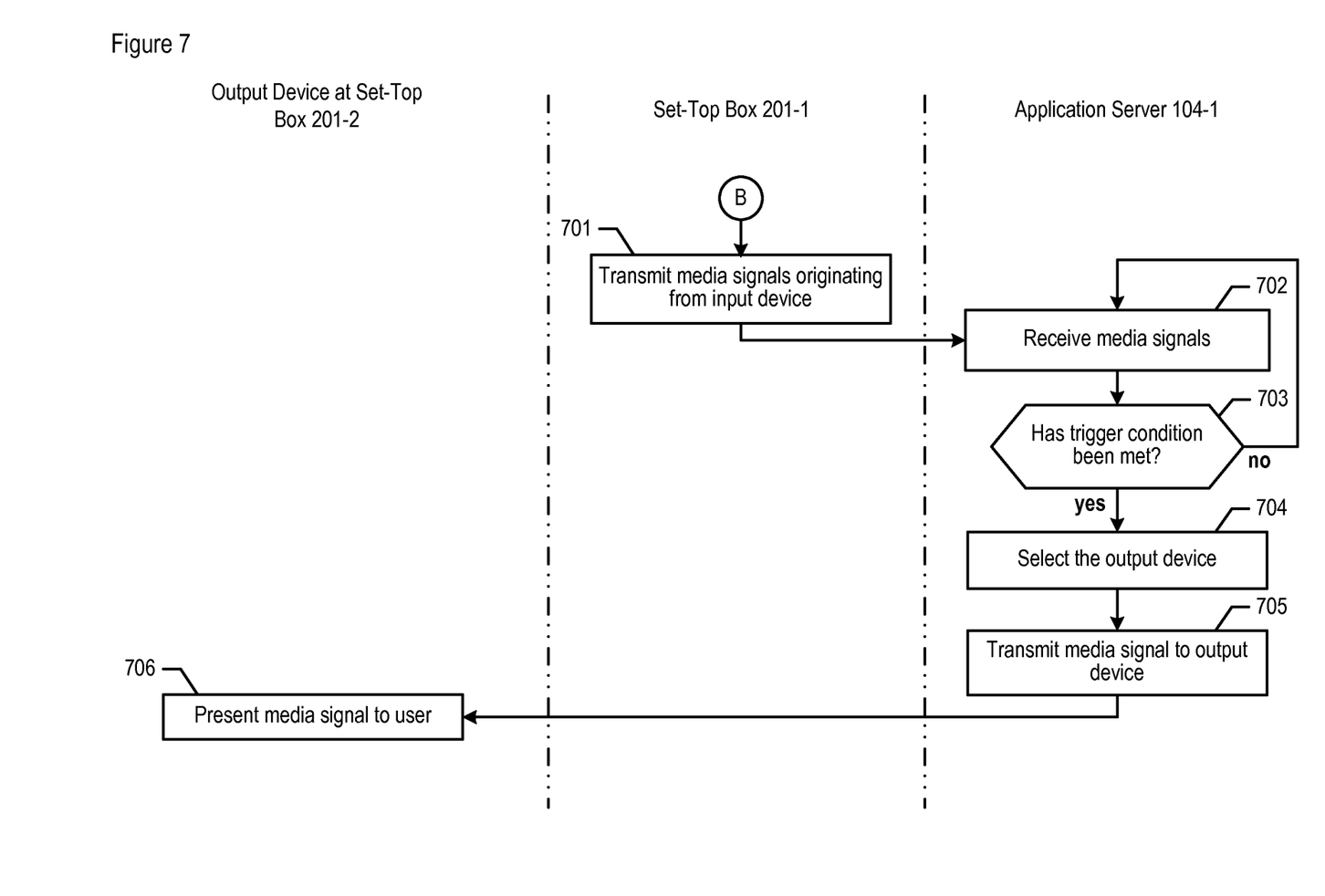
FIG. 7 depicts the selection of media signals received from one or more input devices, and the transmission of the selected media signals to one or more output devices, in accordance with the illustrative embodiment.

FIGS. 5 through 7 depict flowcharts of the salient tasks performed by set-top box 201 and application server 104-n, in accordance with the illustrative embodiment of the present invention. As those who are skilled in the art will appreciate, some or all of the tasks depicted in FIG. 5 through 7 can be performed simultaneously or in a different order than that depicted. As those who are skilled in the art will also appreciate, some or all of the tasks depicted in FIG. 5 through 7 can be performed in a different combination of devices than those depicted, including multiple set-top boxes or multiple application servers, or both, or even different types of devices entirely. Furthermore, each depicted device (e.g., box 201-2, etc.) might perform one or more of the tasks which as depicted are performed by the other device (e.g., server 104-1, etc.).

For pedagogical purposes, a scenario is presented in which a user, the parent of an infant child, wants to monitor her sleeping infant. The infant is in a first room of a house with a camera connected to a first set-top box (i.e., box 201-1), and the parent is in a second room watching television on a television set connected to a second set-top box (i.e., box 201-2).

It will be clear to those skilled in the art, after reading this specification, how to apply the embodiments of the present invention to other monitoring scenarios. For example, the infant-monitoring scenario can be modified such that the parent is outside the house in the yard with a cell phone handy, or is watching television at a neighbor's house on a television set connected to a third set-top box (i.e., box 201-3). In a different scenario entirely, instead of an infant being monitored, it might be a business building that is being monitored for security purposes by the business' owner, or the owner's surveillance service which is using the monitoring service of the illustrative embodiment.

FIG. 5 depicts a flowchart of an initial setup of the monitoring service, in accordance with the illustrative embodiment of the present invention.

At task 501, a user of the monitoring service of the illustrative embodiment initiates the setup of the service. For example, by accessing set-top box 201-2 with a remote control, where the set-top box is connected to a television, the user is able to configure which input devices (e.g., camera connected to box 201-1, etc.) are possibly going to provide media signals which convey monitoring content. Additionally, the user is able to configure which output devices (e.g., television connected to set-top box 201-2, standalone video monitor, user's cell phone, etc.) are possibly going to receive and present media signals which convey monitoring content. An input device can be situated at any customer premises equipment location that has connectivity with the application server providing the monitoring service. Each output device might be directly connected to a set-top box, as part of the customer premises equipment, or might be separate and distinct from any customer premises equipment. Although in this example the user initiates setup through set-top box 201-2, the user could alternatively initiate setup through another set-top box.

At task 502, set-top box 201-2 receives commands from the user, which specify which input devices and output devices are to be configured into the monitoring service. Set-top box 201-2 maps the user-selected devices into identifiers, and transmits the identifiers to the application server that is assigned to support the monitoring services on behalf of the particular user-server 104-1, for example.

At task 503, application server 104-1 receives the identifiers of the configured input and output devices from set-top box 201-2.

At task 504, server 104-1 configures information regarding the monitoring-service devices. For example, configuration can include mapping or translating one or more identifiers of the output devices into destination addresses that are recognizable throughout telecommunications network 100, such as a telephone number or an Internet Protocol (IP) address.

At task 505, server 104-1 transmits an acknowledgment back to set-top box 201-2.

At task 506, set-top box 201-2 presents an acknowledgment to the user, who receives the acknowledgment at task 507.

FIG. 6 depicts a flowchart of a use-case setup, in accordance with the illustrative embodiment of the present invention. The tasks shown in FIG. 6 can be executed immediately following the execution of the tasks shown in FIG. 5, or they can be executed at a later time, such as when the user is ready to actually use the monitoring service of the illustrative embodiment.

At task 601, the user specifies the relevant parameters for the particular use-case being invoked. A use-case is distinguished from initial setup, in that invoking a new or stored use-case might be done fairly often, while initiating setup might be done only once or relatively infrequently. Furthermore, although all of the possible input and output devices might be specified at initial setup, the specific input and output devices that apply to a particular use-case might be specified when a new use-case is created.

By accessing set-top box 201-2 with a remote control, for example, the user is able to specify i) the particular trigger conditions (e.g., motion detected by the camera connected to box 201-1, sound level of a microphone exceeding a threshold, etc.) that will cause application server 104-1 to forward the media signals of interest to an output device and ii) the output device or devices that are to receive the media signals of interest. Additionally, the user might specify one or more input devices associated with one or more set-top boxes that will be providing media signals to application server 104-1. Although in this example the user invokes the use-case through set-top box 201-2, the user could alternatively invoke the use-case through another set-top box.

In the pedagogical example of the parent monitoring her infant, the parent user specifies the microphone associated with set-top box 201-1 as the input device, the trigger condition of a sound level or pattern having been detected that correlates to stirring or crying on the part of the infant, and the television at set-top box 201-2 as the output device.

At task 602, set-top box 201-2 receives commands from the user, which specify the information entered by the user at task 501. Set-top box 201-2 transmits the parameters (e.g., trigger conditions, output devices, etc.) to assigned application server 104-1.

At task 603, application server 104-1 receives the user-specified trigger conditions and selected devices from set-top box 201-2.

At task 604, server 104-1 establishes the conditions in which to forward received media signals to the selected output device or devices, in accordance with the illustrative embodiment. For example, for a media signal conveying audio content, server 104-1 might establish a particular signal level threshold based on what was specified by the user, wherein a trigger condition is met when the threshold is exceeded. Trigger conditions might also be based on calendrical time such as time of day, day of the week, calendar date, and so forth, such that different thresholds are used at different times. Additionally, the particular output device to receive the forwarded media signals might be based on calendrical time as well, such that the user's television is provided with the media signals during a first time interval, while the user's cell phone is provided with the media signals during a second time interval.

In accordance with the illustrative embodiment, when there are two or more input devices specified, server 104-1 can establish different conditions for each source. For example, for media signals conveying video content, a higher threshold of motion might be applied to a camera monitoring a room with motion already present in the background, such as from an electric fan, while a lower threshold of motion might be applied to a camera monitoring a room where nothing should be in motion during the monitoring interval.

At task 605, server 104-1 transmits an acknowledgment back to set-top box 201-2. In some embodiments, server 104-1 commands the set-top boxes with the selected input devices (e.g., the camera at box 201-1, etc.) to start transmitting the media signals; the server does so either at a specified time or immediately.

At task 606, set-top box 201-2 presents an acknowledgment to the user, who receives the acknowledgment at task 607.

FIG. 7 depicts the selection of media signals received from one or more input devices during the monitoring interval after a use-case has been started, and the transmission of the selected media signals to one or more output devices, in accordance with the illustrative embodiment of the present invention.

At task 701, set-top box 201-1 transmits media signals from the input device (i.e., microphone monitoring the infant) to application server 104-1.

At task 702, server 104-1 receives the media signals.

At task 703, server 104-1 evaluates the media signals that it receives against one or more trigger conditions, and determines whether a trigger condition established at task 604 has been met. If a condition has been met, task execution proceeds to task 703. If not, server 104-1 continues to receive media signals and to determine whether a trigger condition has been met with respect to the additional media signals received. In some alternative embodiments, set-top box 201-1 performs tasks 702 and 703 instead of server 104-1, which in no way changes the desired function of the system, as can be appreciated by those skilled in the art.

At task 704, server 104-1 selects the particular output device to which to send the media signal of interest. The output device might be a single output device specified by the user (i.e., the television being watched by the parent and connected to box 201-2) or it might be one of several possible output devices, where the particular device selected is based on calendrical time or on another property.

In the scenario presented, the user specifies the valid output device or devices for the particular use-case created, and server 104-1 selects the particular output device from the group of valid devices specified by the user. However, as those who are skilled in the art will appreciate after reading this specification, the particular output device selected can be based on the geo-location of the user. Techniques for determining the geo-location of the user are well-known in the art; server 104-1 can use one or more of these techniques to determine the user's geo-location, in order to select the particular device nearest to the user.

At task 705, server 104-1 transmits the media signal of interest to the selected output device. The destination address used for routing the media signal might be within the address space of MSO network 120, which is a part of telecommunications network 100, or the destination address might be within another address space (e.g., telephone number, Internet Protocol number, etc.).

In some alternative embodiments, server 104-1 transmits to the output device a representative message or signal, either instead of or addition to the media signal itself. For example, a text message that reads "Motion detected in Room A" or "Baby is crying" can be transmitted to the output device and then presented to the user.

In some other alternative embodiments, server 104-1 transmits to the output device an indication for the output device to preempt the presentation of whatever content was being presented to the user. For example, if the user is watching television programming through set-top box 201-2, when server 104-1 detects a loud signal in the media signals that it is receiving from box 201-1, server 104-1 can indicate to box 201-2 to mute the audio of the television programming and instead the audio received from box 201-1 (monitoring the infant) to the user. Alternatively, the set-top box (box 201-2 in this case) can determine whether to preempt the audio or not.

As those who are skilled in the art will appreciate, the preemption of one signal with another can apply to video as well, in that some or all of the video screen can be borrowed from the ongoing video, in order to present the video received from the monitoring source such as set-top box 201-1.

At task 706, the output device presents the media signal to the user.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    receiving, at a server, running an Open Cable Application Platform ("OCAP") compliant application program:
        i) a first identifier of an input device, the input device being situated at a first customer premises equipment location and being capable of generating a first media signal,
        ii) a second identifier of an output device, the output device being capable of presenting the first media signal to a user, and
        iii) a trigger condition for evaluating the first media signal, wherein the trigger condition is based upon calendrical time and the server being situated at a location that is different from the first customer premises equipment location;
    receiving, at the server, the first media signal originating at the input device represented by the first identifier; and
    when the trigger condition is met, the OCAP compliant application program transmitting the first media signal to:
        the output device represented by the second identifier during a first predefined period of time, wherein the first predefined period of time is defined in a calendar; and
        an output device represented by a third identifier during a second predefined period of time, wherein the second predefined period of time is defined in the calendar.

2. The method of claim 1 wherein the input device is a camera and the output device is one of a video monitor and a television.

3. The method of claim 1 wherein the input device is a camera and the output device is a cellular telephone.

4. The method of claim 1 further comprising mapping the second identifier to a predetermined address, wherein transmitting the first media signal comprises routing it to the predetermined address.

5. The method of claim 4 wherein the predetermined address is based upon a telephone number.

6. The method of claim 4 wherein the predetermined address is based upon an Internet Protocol address.

7. The method of claim 1, wherein the input device is only a microphone and the output device represented by the second identifier is a television and wherein the first media signal only preempts an audio content of the television while not preempting a video signal being displayed on the television.

8. A method comprising:
receiving, at a server, running an Open Cable Application Platform ("OCAP") compliant application program: i) a first identifier of a predetermined output device and ii) a media signal from a set-top box, the output device being situated at a different location than the customer premises equipment location of the set-top box;
determining by the OCAP compliant application program whether a trigger condition has been met, wherein the trigger condition is for evaluating the media signal and is based upon calendrical time; and
when the trigger condition has been met, the OCAP compliant application program transmitting the media signal to the output device represented by the first identifier during a first predefined period of time and to an output device represented by a second identifier during a second predefined period of time, wherein the first predefined period of time is defined in a calendar and wherein the second predefined period of time is defined in the calendar.

9. The method of claim 8 wherein the output device is a cellular telephone.

10. The method of claim 8 wherein the output device is one of a video monitor and a television.

11. The method of claim 8 wherein the media signal conveys video content, and wherein the trigger condition relates to whether motion has been detected in the video content.

12. The method of claim 8 wherein the media signal conveys audio content, and wherein the trigger condition relates to whether a predetermined characteristic of the audio content has exceeded a threshold.

13. The method of claim 12 wherein the predetermined characteristic is signal level.

14. The method of claim 8 further comprising selecting the output device represented by the first identifier, from a plurality of output devices that are capable of receiving the media signal, wherein the selecting is based upon calendrical time.

15. The method of claim 8 wherein the determining of whether the trigger condition has been met is performed at the set-top box.

16. The method of claim 8 wherein the determining of whether the trigger condition has been met is performed at the server.

17. The method of claim 8, wherein the output device represented by the second identifier is a television and wherein the media signal only preempts an audio content of the television while not preempting a video signal being displayed on the television.

* * * * *